United States Patent
Garro et al.

[11] Patent Number: 5,996,663
[45] Date of Patent: Dec. 7, 1999

[54] VULCANIZABLE RUBBER COMPOSITION, IN PARTICULAR FOR LOW ROLLING RESISTANCE TREADS FOR VEHICLE TIRES

[75] Inventors: Luciano Garro, Ornago; Angela Amaddeo, Arienzo, both of Italy

[73] Assignee: Pirelli Coordinamento Pneumatici SpA, Milan, Italy

[21] Appl. No.: 08/831,978

[22] Filed: Apr. 2, 1997

[30] Foreign Application Priority Data

Apr. 10, 1996 [IT] Italy .................................. MI96A0680

[51] Int. Cl.⁶ ...................................................... B60C 1/00
[52] U.S. Cl. ......................... 152/564; 156/128.1; 156/129
[58] Field of Search ................................ 156/117, 128.1, 156/129; 152/564

[56] References Cited

U.S. PATENT DOCUMENTS 5,351,735 10/1994 Okuda .
5,362,793 11/1994 Garro et al. ............................ 514/495

FOREIGN PATENT DOCUMENTS 510410  10/1992  European Pat. Off. .
61-231014 10/1986  Japan .
7-48476   2/1995  Japan .
7048476   2/1995  Japan .
91/12202  8/1991  WIPO .
9112202   8/1991  WIPO .

*Primary Examiner*—Robert Dawson
*Assistant Examiner*—D. Aylward
*Attorney, Agent, or Firm*—Stevens, Davis, Miller & Mosher, L.L.P.

[57] ABSTRACT

A vulcanizable rubber composition is described comprising a cross-linkable unsaturated chain polymer base including natural rubber, at least a copolymer obtainable by polymerizing a conjugated diolefin with a vinyl aromatic hydrocarbon, and a main carbon black-based reinforcing filler, wherein:

a) the copolymer is obtainable by polymerizing in 1,2 form with the vinyl aromatic hydrocarbon at least 50% by weight of the conjugated diolefin, so as to obtain in the copolymer a quantity of from 30% to 70% by weight to the total weight of the same of an olefin fraction having a 1,2 structure, and b) the carbon black has a DBP absorption value measured according to ISO 4656-1 equal to at least 110 ml/100 g, a reduction in the DBP absorption value measured after compression according to ISO 6894 equal to at least 25 ml/100 g and a surface area measured by means of CTAB absorption according to ISO 6810 not greater than 120 m²/g.

5 Claims, 1 Drawing Sheet

VULCANIZABLE RUBBER COMPOSITION, IN PARTICULAR FOR LOW ROLLING RESISTANCE TREADS FOR VEHICLE TIRES

FIELD OF THE INVENTION

The present invention relates to a vulcanizable rubber composition of the type comprising a cross-linkable unsaturated chain polymer base, which has a preferred—but not exclusive—use in the production of treads for vehicle tyres.

More particularly, the present invention relates to a vulcanizable rubber composition comprising a cross-linkable unsaturated chain polymer base including natural rubber and at least a copolymer obtainable by polymerizing at least a conjugated diolefin with at least a vinyl aromatic hydrocarbon, as well as a carbon black-based reinforcing filler.

The invention also refers to a tread and to a tire obtainable from said composition.

BACKGROUND OF THE INVENTION

As is known, in the field of vehicle tire manufacture one of the more difficult objects to be reached has always been that of reducing the rolling resistance of the tire, achieving at the same time a good wear resistance and a satisfactory skid resistance on wet road.

It is also known that the difficulties for achieving the aforementioned object arise essentially from the fact that the tire rolling resistance on the one hand and the wear resistance and wet skid resistance on the other hand, are affected in an entirely opposite manner by the amount of reinforcing filler—substantially carbon black—employed in the composition used to manufacture the tire tread.

In order to reduce the rolling resistance of the tire, in fact, it would be desirable to reduce the amount of the reinforcing filler used in the composition (for instance, below 70 parts every 100 parts by weight of the composition polymer base): in so doing, however, a falling off to unacceptable values of both wet skid resistance and wear resistance of the tire has been observed.

In order to overcome somehow this limitation of the compositions comprising carbon black-based fillers, the prior art has suggested to partly or fully replace the latter by so-called "white" fillers, in particular silica, as is described for instance in European Patent application EP 0 501 227.

Even though silica-based reinforcing fillers have allowed to reduce the tire rolling resistance without significantly affecting wear resistance and wet skid resistance, their use is not devoid of drawbacks.

In fact, these reinforcing fillers, besides having a cost much higher than the cost of carbon black, have per se a poor affinity with the polymer base of the compositions employed in the manufacture of tires and—as such—require the use of suitable coupling agents that may chemically bind silica to the polymer matrix.

However, the need of using such coupling agents limits the maximum temperature attainable during the mixing and mechanical working operations of the composition, not to trigger off an irreversible thermal degradation of the coupling agent.

But the respect of the aforementioned temperature constraint involves a marked reduction in the very mechanical mixing action that is of the essential for an optimum dispersion of silica throughout the polymer matrix.

The ensuing insufficient dispersion of silica in the composition causes in its turn several drawbacks, basically related to the extreme variability and non homogeneity of the physico-mechanical characteristics of the composition from zone to zone of the same.

In the different attempts made to manufacture a tread starting from compositions including silica as main reinforcing filler, a remarkable drawing difficulty and a size variability of the tread obtained from the so-produced compositions have been observed.

To all these drawbacks another, non negligible one must be added, namely the reduced production capacity of the drawing apparatuses used for tread manufacture.

All this reduces the hourly production capacity of the plants, which causes an increase in production costs.

Lastly, the electric conductivity of tires including silica-based reinforcing fillers, is drastically reduced, which involves an accumulation of electrostatic charges that, in some cases, may disturb the electronic apparatuses which are aboard the vehicle or even cause sudden electric discharges of dangerous intensity.

SUMMARY OF THE INVENTION

The technical problem underlying the present invention is therefore that of providing a rubber composition including carbon black as main reinforcing filler, which allows to reduce the rolling resistance without affecting the wear resistance and wet skid resistance of the tire.

According to the invention, the above problem is solved by a vulcanizable rubber composition comprising a cross-linkable unsaturated chain polymer base including natural rubber and at least a copolymer obtainable by polymerizing at least a conjugated diolefin with at least a vinyl aromatic hydrocarbon, said composition further comprising at least a carbon black-based reinforcing filler, characterized in that:

a) said at least one copolymer is obtainable by polymerizing in 1,2 form with the vinyl aromatic hydrocarbon at least 50% by weight of the conjugated diolefin, so as to obtain in the copolymer a quantity of from 30% to 70% by weight to the total weight thereof of an olefin fraction having a 1,2 structure, and b) said carbon black has a DBP absorption value measured according to ISO 4656-1 equal to at least 110 ml/100 g, a reduction in the DBP absorption value as measured after compression according to ISO 6894 equal to at least 25 ml/100 g and a surface area as measured by means of CTAB absorption according to ISO 6810 not greater than 120 m$^2$/g.

In the following description and in the appended claims, the term: 1,2 polymerization, is intended to indicate a particular stereospecific polymerization method between the conjugated diolefin and the vinyl aromatic hydrocarbon by means of which the formation of a copolymer is obtained in which the olefin fraction comprises a prefixed quantity of side-chain vinyl groups —CH=CH$_2$ bound to the polymer chain. Methods for the 1,2 polymerization of conjugated olefins are well known in the art and are described, for instance, in U.S. Pat. Nos. 3,451,988 and 4,264,753.

According to the present invention, it has been surprisingly observed that the rolling resistance of a tread may be advantageously reduced, even when carbon black-based reinforcing fillers are used in the starting composition, without affecting neither the wear resistance nor the wet skid resistance of the tire.

This may be achieved by using in the composition a particular polymer base including a so-called "high vinyl" copolymer (i.e. a copolymer wherein at least 50% by weight of the conjugated diolefin polymerizes in 1,2 form with the vinyl aromatic hydrocarbon) and a carbon black having particular characteristics of structure and surface area.

This result is all the more surprising if one considers that high vinyl polymers fall among those that the known art suggests to use in association with silica-based fillers, i.e. those fillers that are delegated to replace carbon black, but not with carbon black per se.

See on the matter, for instance the article "Comparison of the Elastomer Filler Interaction between Chemically Modified and Emulsion SBR with Carbon Black and Silica Fillers", by Ayala et al., delivered at the meeting of the American Chemical Society, Rubber Division, held in Cleveland, Ohio, U.S.A., from 17 to 20 October 1995.

From the experimental tests mentioned in said article, in fact, it may be inferred that while a high content of vinyl groups in the polymer base facilitates on the one hand the incorporation of silica in the composition, because of the greater affinity with the latter, it has, on the other hand, a deleterious effect on the rolling resistance of the compositions including carbon black, which drops to unacceptable values (see, for instance, Table VII).

According to the invention, the conjugated diolefin/vinyl aromatic hydrocarbon copolymer may be obtained by polymerizing in 1,2 form at least 50% by weight of the conjugated diolefin to the total weight of conjugated diolefin used in the polymerization.

Preferably, the conjugated diolefin/vinyl aromatic hydrocarbon copolymer of the invention is obtained by polymerizing in 1,2 form a quantity of conjugated diolefin of from 60 to 70% by weight to the total weight of the diolefin used in the polymerization.

Preferably, furthermore, the conjugated diolefin/vinyl aromatic hydrocarbon copolymer is obtained by using a quantity of vinyl aromatic hydrocarbon not greater than 25% by weight to the total weight of the conjugated diolefin and of the same hydrocarbon.

As a consequence of this, the olefin fraction of the resulting copolymer preferably comprises a quantity of 1,2 structure ranging between 40% to 60% by weight to the total weight of the same copolymer.

DETAILED DESCRIPTION OF THE PREFERRED EMBODIMENTS

Figure 1:
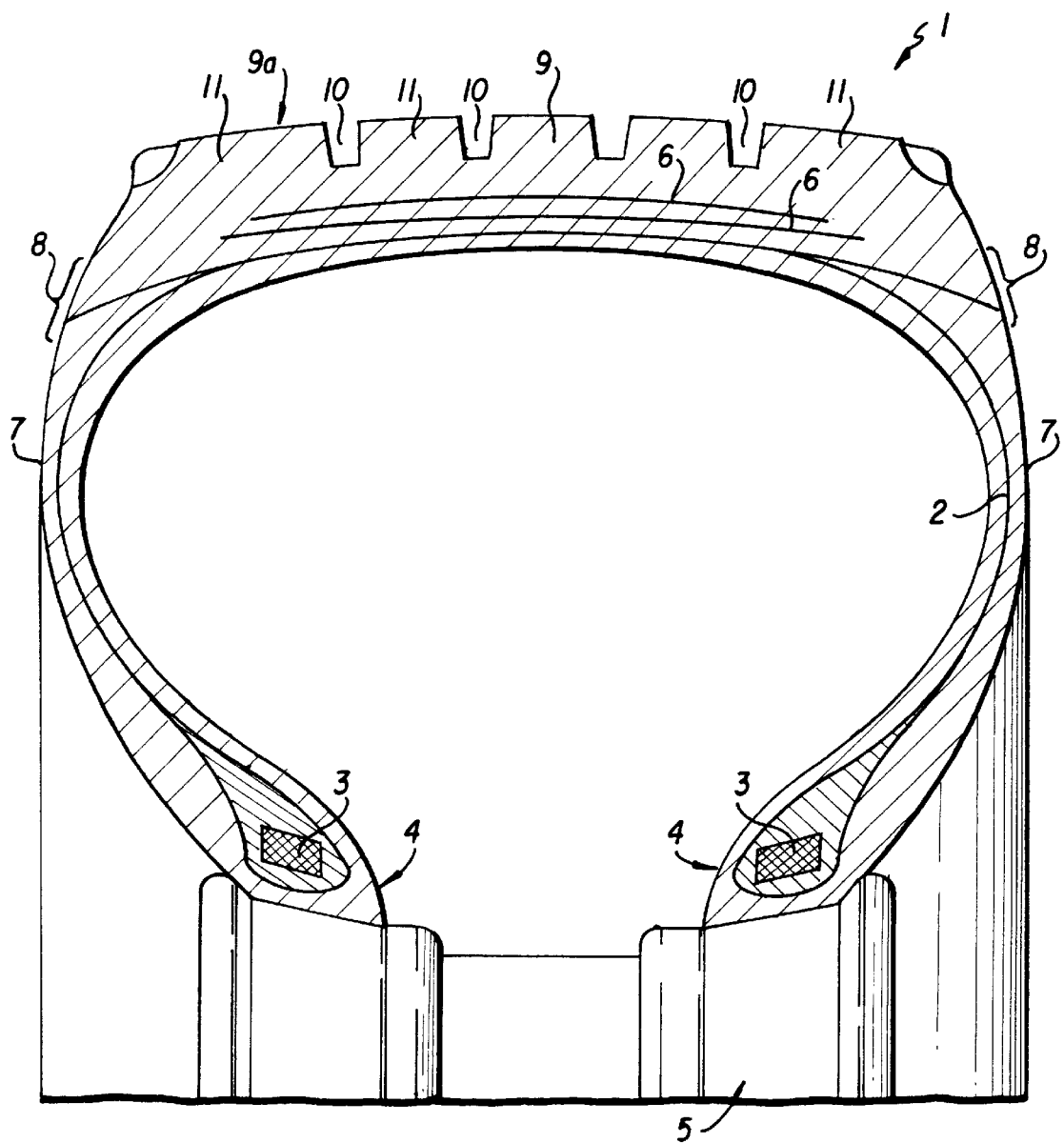
FIG. 1 is the sole FIGURE and shows a cross-sectional view of an embodiment of the present invention.

In the following description and in the appended claims, the term: 1,2 structure is intended to indicate the part of the olefin fraction of the conjugated diolefin/vinyl aromatic hydrocarbon copolymer formed by the following repetitive unit:

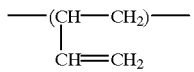

Advantageously, the rolling resistance of a tire obtainable from the composition of the invention may be reduced by using in the composition a so-called "terminated" conjugated diolefin/vinyl aromatic hydrocarbon copolymer.

In this description, the term: "terminated" copolymer is intended to indicate a copolymer obtainable by means of a polymerization reaction of the conjugated diolefin with a vinyl aromatic hydrocarbon in the presence of a organolithium initiator and by a subsequent reaction with a suitable chain-terminating compound selected from the group comprising: substituted imines, benzophenone, 4,4'-bis (diethylamino)benzophenone, 4-diethylaminobenzophenone, a tin halogenated compound, and mixtures thereof.

The substituted imines of preferred use are selected from the group comprising the imines having the following structural formula:

(I)

wherein $R_1$ and $R_2$ are selected from the group comprising H, alkyl, cycloalkyl, aryl, dialkylaminoaryl, aralkyl groups and aprotic O-, N- and S-containing alkyl, cycloalkyl, aryl, aralkyl groups; $R_3$ is selected from the group comprising alkyl, cycloalkyl, aryl, dialkylaminoaryl, aralkyl groups and aprotic O-, N- and S-containing alkyl, cycloalkyl, aryl and aralkyl groups; at least one of said groups $R_1$, $R_2$ and $R_3$ being a dialkylaminoaryl group, compounds in which said groups $R_1$, $R_2$ and $R_3$ are simultaneously aryl groups being excluded.

The terminated copolymers of the invention may be prepared according to methods known in the art, such as for instance those described in European Patent application EP 0 451 604.

Alternatively, the rolling resistance of a tire obtainable from the composition of the invention may be further reduced by using in the composition a so-called "coupled" conjugated diolefin/vinyl aromatic hydrocarbon copolymer.

In the present description, the term: "coupled" copolymer is intended to indicate a copolymer obtainable by polymerization of the conjugated diolefin with a vinyl aromatic hydrocarbon in the presence of a organolithium initiator and by a subsequent coupling of the polymer chains with a compound comprising a tin halogenated compound, with the primary purpose of increasing the molecular weight of the copolymer thus obtained.

Coupled copolymers of preferred use may be prepared according to methods known in the art, such as for instance those disclosed by U.S. Pat. No. 4,742,124.

Both in the case of terminated copolymers and in the case of coupled copolymers, the organolithium initiator is preferably selected from the group comprising: polyfunctional organolithium initiators, monofunctional organolithium initiators in association with polyfunctional monomers, and mixtures thereof.

Tin halogenated compounds of preferred use, on the other hand, are selected from the group comprising: dimethyl dichlorotin, dibutyl dichlorotin, tin tetrachloride, tributyl chlorotin, butyl trichlorotin, methyl trichlorotin, tin dichloride, and mixtures thereof.

A further and advantageous reduction in the tire rolling resistance may be achieved by using in the composition a coupled and terminated copolymer, i.e. in which the copolymer obtained after coupling with the halogenated tin compound is caused to react with a suitable chain-terminating compound, such as for instance one of the aforementioned preferred compounds.

In such a case and as will be more apparent in the following description, the best results in terms of rolling resistance reduction have been observed.

The preferred polymer bases suitable for the purposes of the invention are those wherein said conjugated diolefin is selected from the group comprising: 1,3-butadiene, isoprene, 2,3-dimethyl-1,3-butadiene, 1,3-pentadiene, 1,3-hexadiene, and mixtures thereof.

For the purposes of the invention, furthermore, the aforementioned vinyl aromatic hydrocarbon is preferably selected from the group comprising: styrene, alpha-methyl-styrene, p-methyl-styrene, vinyl-toluene, vinyl-naphthalene, vinyl-pyridine and mixtures thereof.

Preferably, the polymer base of the invention comprises from 30 to 70% by weight of a styrene-butadiene copolymer obtained by means of anionic polymerization in solution, per each 100 parts by weight of polymer base.

For the purpose of imparting adequate hysteretic characteristics to the tread obtainable from the composition of the invention, the polymer base preferably comprises a quantity of natural rubber of from 30 to 70 parts by weight per each 100 parts by weight of polymer base.

With regard to the use of natural rubber in the composition, it has to be observed that the high vinyl polymers of the invention advantageously allow to limit a particular degradation phenomenon of the composition, the so-called "reversion", which comes up in a more or less marked form during the vulcanization of the natural rubber.

Thanks to the presence of high vinyl copolymers, the composition of the invention may therefore be vulcanized, contrary to what happens with the compositions of conventional type including natural rubber, with high sulphur content vulcanizing systems that improve both the rolling resistance and the fatigue resistance of the vulcanized tread.

According to a further embodiment of the invention, the polymer base of the composition may further comprise polybutadiene in a quantity of from 5 to 20% by weight to the total weight of polymer base.

Preferably, such polybutadiene is of the so-called high cis content type, i.e. it has a content of 1,4-cis fraction equal to at least 60% by weight to the total weight thereof.

According to the invention, it has been wholly unexpectedly found that thanks to the use of a carbon black-based reinforcing filler having particular characteristics of "structure" or aggregation degree of the particles and of surface area, it is possible to reduce the quantity of carbon-black, to the advantage of a reduced rolling resistance, while keeping the characteristics of wet skid resistance and wear resistance at more than satisfactory values.

As to the structure, it has been found that optimum results—with regard to wet skid resistance and wear resistance—may be obtained when the carbon black of the invention has a high "structure" (i.e. a high aggregation degree), which is however rather easily disgregable, producing aggregates having a lower structural complexity.

From the experimental point of view, these characteristics may be correlated to the capacity of carbon black of absorbing a particular sterically hindered molecule—namely, dibutylphthalate—and, respectively, to the reduction of said absorption capacity after a suitable mechanical action of controlled destructuration.

Based on such correlation, the higher is the "structure" of a carbon black, the greater is the absorption value of dibutylphthalate (in the following DBP), while the more marked is the tendency to disgregate, the more consistent is the reduction of the DBP absorption value following controlled destructuration (in the following ΔDBP).

The high structure carbon black of the invention shows—as such—a DBP absorption value, measured according to the standards ISO 4656-1, equal to at least 110 ml/100 g and a reduction in the DBP absorption value (ΔDBP), measured after compression according to the standards ISO 6894, equal to at least 25 ml/100 g.

Preferably, the carbon black has a DBP absorption value, measured according to ISO 4656-1, of from 130 to 160 ml, and a reduction in the DBP absorption value (ΔDBP), measured after compression according to ISO 6894, of from 30 to 50 ml/100 g.

As to the surface area, it has been found that optimum results—in terms of wet skid resistance and wear resistance—may be obtained when the carbon black of the invention has a limited surface area, i.e., comprises rather coarse particles.

From the experimental point of view, the surface area characteristics of carbon black particles may be correlated to the capacity of absorbing a particular molecule, the cetyl-trimethyl ammonium bromide or CTAB.

Based on such correlation, the higher is surface area of a carbon black the greater is the absorption value of cetyl-trimethyl ammonium.

Owing to the inverse proportionality between surface area and particle size, there also ensues that the carbon black particles are the smaller the higher is the CTAB absorption value.

According to the invention, the high structure carbon black of the invention has a surface area—as determined based on the absorption of cetyl-trimethyl ammonium according to the standards ISO 6810 (in the following CTAB absorption)—not greater than 120 $m^2/g$.

Preferably, carbon black has a surface area as measured by means of CTAB absorption of from 70 to 100 $m^2/g$.

Preferably, the composition of the invention comprises 45 to 65 parts by weight of carbon black-based reinforcing filler per each 100 parts by weight of polymer base.

According to an embodiment of the invention, the composition may further comprise a so-called "white" secondary inorganic reinforcing filler, such as for instance, gypsum, kaolin, bentonite, titanium dioxide, silicates of various type and, preferably, silica.

In the following description and in the appended claims, the term: silica-based reinforcing filler is intended to indicate a reinforcing agent based on silicon dioxide (silica), silicates and mixtures thereof, having a surface area, measured according to the BET method, of from 100 to 300 $m^2/g$.

For the sole purpose of simplifying the present description, the silica-based fillers of the invention will be indicated in the following by the term: silica.

In this embodiment of the invention, it is particularly advantageous to incorporate in the composition 0 to 25 parts by weight of silica per each 100 parts by weight of polymer base.

In this case, the quantity of carbon black may be further reduced down to values of from 35 to 45 parts by weight per each 100 parts by weight of polymer base.

When the composition incorporates such a quantity of carbon black and silica, an advantageous reduction in the tire rolling resistance may be achieved, while retaining a good wear resistance and a good wet skid resistance.

When the secondary reinforcing filler is silica-based, the compositions of the invention preferably incorporate a suitable coupling agent that may chemically react with silica and bind the latter to the polymer base during the vulcanization of the same.

Preferred coupling agents are silane-based and have the following structural formula:

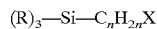  (II)

wherein:

R is an alkyl or alkoxy group comprising 1 to 4 carbon atoms or a chlorine atom, n is an integer of from 1 to 6, and X is a group selected from —Si$_m$—C$_n$H$_{2n}$—Si—R, a nitroso group, a mercapto group, an amino group, an epoxy group, a vinyl group, an imido group, one atom of chlorine, one or more atoms of sulfur, or a S$_m$Y group, wherein Y is selected from among the following functional groups:

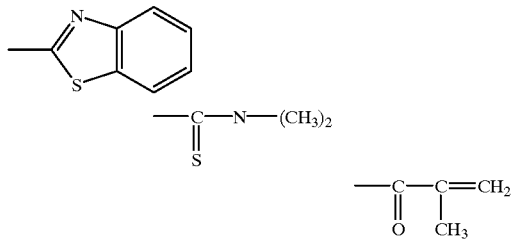

wherein m and n are an integer of from 1 to 6, and R is an alkyl or an alkoxy group comprising 1 to 4 carbon atoms or a chlorine atom.

Particularly preferred among them is the silane coupling agent Si69 [bis(3-triethoxysilyl-propyl)tetrasulphide] (DEGUSSA) as such or in a suitable mixture with a moderate quantity of inert filler (for instance carbon black or the same silica), so as to facilitate its incorporation into the composition, or X50S (Degussa) (50% carbon black, 50% silane).

In addition to the aforementioned ingredients, the composition of the invention incorporates one or more non cross-linking ingredients, known in themselves, necessary to impart to the composition the necessary mechanical and workability characteristics.

Such ingredients, are in particular selected from the group comprising plasticizers, working adjuvants, antioxidants, age-retarding agents, etc.

Besides, each of these ingredients is selected in quantities and proportions easily determinable by those skilled in the art.

The composition is also rendered cross-linkable by adding and incorporating therein a suitable vulcanizing agent, possibly and preferably accompanied by suitable activators and vulcanization accelerators.

As mentioned hereinabove, the vulcanizing agent of most advantageous use is sulphur or sulphur-containing molecules (sulphur donors), with accelerators and activators well known to those skilled in the art.

Among the vulcanization activators, preferred is zinc stearate, directly formed in the composition, by adding zinc oxide and stearic acid therein.

Solely by way of non limitative indication, Table I hereunder illustrates the typical ingredients of a rubber composition according to the invention in parts by weight per each 100 parts by weight of polymer base (phr).

TABLE I

| ingredient | quantity (phr) |
| --- | --- |
| conjugated diolefin/vinyl aromatic hydrocarbon copolymer | 30–70 |
| natural rubber | 30–70 |
| carbon black | 35–65 |
| silica | 0–25 |
| silica coupling agent | 0–2.5 |
| ZnO | 1–5 |
| stearic acid | 0–5 |
| antioxidants | 1–3 |

TABLE I-continued

| ingredient | quantity (phr) |
| --- | --- |
| antifatigue agents | 0.5–3 |
| sulphur or donors thereof | 0.5–3 |
| accelerators | 0.5–3 |
| plasticizers | 0–40 | phr=parts by weight per each 100 parts by weight of polymer base.

The aforementioned rubber composition may be obtained by means of quite conventional mixing operations, well known to those skilled in the art, which will be not described in detail.

According to a further aspect of the invention, a tread is provided having good rolling resistance, good wear resistance and good wet skid resistance, obtainable by forming a vulcanizable rubber composition of the kind described hereinabove.

Preferably, the tread of the invention is obtained by drawing, molding or calendering at a temperature of from 80 to 120° C.

Advantageously, the tread—once vulcanized according to known operations—shows hysteretic characteristics which allow not only a reduction in rolling resistance, but also an adequate wet skid resistance.

Based on tests performed by the Applicant and as will be more apparent in the following description, the rolling resistance and the wet skid resistance may be correlated to the following dynamic properties of tire treads:

E'=dynamic elastic modulus (measuring the energy retained and recovered during a cyclic deformation);

E"=loss modulus (measuring the heat-dissipated energy during a cyclic deformation);

tanδ=E"/E'

Based on the tests carried out, the wet skid resistance of the tire is the better the higher is the value of tanδ measured at 0° C.; while the rolling resistance is lower the lower is the value of tanδ measured at 70° C.

On the basis of the correlations between the characteristics of the tires and the dynamic properties discussed hereinabove, the treads and the tires of the invention preferably have a value of tanδ at 0° C. higher than 0.45 and a value of tanδ at 70° C. lower than 0.16.

According to a further aspect of the invention, a process is provided for the manufacture of tires for vehicle wheels comprising the steps of preparing around the circumference of a carcass a tread externally provided with a rolling surface, and of linking by vulcanization said carcass to said tread, characterized in that said tread is obtained by forming a vulcanizable rubber composition of the above described type.

According to a further aspect, the present invention also relates to a tire for vehicle wheels whose tread shows a reduced resistance to wear and a good wet skid resistance.

Very surprisingly, the tires of the invention, subject to road tests and compared with tires fully identical but including a tread manufactured according to the prior art, have achieved a lower rolling resistance, while keeping substantially unalterated the values of wear resistance and wet skid resistance.

Hence, according to a further aspect, the present invention relates to a process to reduce the rolling resistance of tires, characterized in that the tyre tread is obtained by submitting to forming a composition of vulcanizable rubber of the above described type.

Further characteristics and advantages of the invention will be more readily apparent from the following description of some examples of vulcanizable rubber compositions, treads and—made solely by way of non limitative indication—with reference to the attached drawing whose only FIGURE shows a partly interrupted cross section of a tire according to the present invention.

With reference to said FIGURE, a tire 1 conventionally comprises at least a carcass ply 2 whose opposed side edges are externally bent around bead wires 3, incorporated each in a bead 4, defined along an internal circumferential edge of the tire, wherein the tire itself engages on a wheel rim of a vehicle.

Along the circumferential development of the carcass ply 2 one or more belt strips 6 made of textile or metal cords incorporated into a rubber composition sheet are applied.

Externally to the carcass ply 2, in respective opposed side portion thereof, a couple of sidewalls 7 is applied, each of which extends from bead 4 up to a so-called "shoulder" zone 8 of the tire, defined in correspondence of the opposed ends of the belt strips 6.

Onto the belt strips 6 a tread 9 is circumferentially applied whose side edges end in correspondence of the shoulders 8, joining with the sidewalls 7. Tread 9 has an external rolling surface 9a, designed to get in touch with the ground, wherein circumferential grooves 10 may be obtained, intercalated by transversal grooves, not shown in the attached FIGURE, which define a plurality of tread blocks 11 variously distributed along said rolling surface 9a.

The above described tire 1 may be manufactured by means of a process including a plurality of production steps, conventional in themselves and known in the art.

More particularly, such process comprises the steps of preliminarily and independently preparing several semi-finished products corresponding to the different parts of the tire (carcass plies, belt strips, bead wires, fillings, sidewalls and treads) which are successively assembled to one another by a suitable assembling machine.

The subsequent vulcanization step then welds together the above semi-finished products to form a monolithic block, i.e. the tire.

Clearly, the step of preparing the above semi-finished products is preceded by a step of preparing and forming the corresponding rubber compositions.

In the tires of the invention, the tread 9 is produced by forming a vulcanizable rubber composition of the type described above.

EXAMPLE 1

In a closed rotor mixer (Banbury) model 11D of the company POMINI, which has been caused to rotate at a speed of about 40 r.p.m., the following ingredients were loaded in sequence:

SMR 20=natural rubber (Standard Malesian Rubber);

S-SBR=butadiene-styrene copolymer prepared in solution, having a 1,2 structure content equal to about 57% by weight, and a styrene content equal to 25% by weight, available on the market under the trade name NS116™ (Nippon Zeon);

carbon black=Vulcan 1380 (Cabot Corporation);

age-retarding agent=6PPD, also known as SANTOFLEX 13 (Monsanto);

anti-fatigue agent=TMQ, also known as VULCANOX 4020 (Bayer), as well as other ingredients of common use in smaller amounts.

The structure and surface area characteristics of the carbon black used were the following:

DBP (ISO 4656-1): 143 ml/100 g;

compressed DBP (ISO 6894): 105 ml/100 g;

CTAB (ISO 6810): 84 $m^2/g$.

The obtained composition was loaded, after cooling at room temperature, in a closed rotor mixer (Banbury) model 11D of the company POMINI, which was caused to rotate at the speed of about 20 r.p.m. together with the following ingredients:

sulphur;

vulcanization accelerators [(diphenylguanidine (Monsanto) and SANTOCURE CBS (Monsanto)].

The composition was then submitted to intimate mixing, so as to disperse the vulcanizing system, taking care to keep the temperature of the composition at a value of about 100° C., to avoid a premature triggering of vulcanization.

After about 4', 180 kg of a vulcanizable rubber composition were discharged, having the composition shown in the following Table II (parts by weight).

EXAMPLES 2–3

In accordance with the procedure described in preceding Example 1, several rubber compositions were prepared in which different high vinyl copolymers according to the invention were used, the other ingredients being equal.

More particularly, the following copolymers were used:

a butadiene-styrene copolymer prepared in solution having a 1,2 structure content equal to 56% by weight and a styrene content equal to 20% by weight, available on the market under the trade name SL563™ (Japan Synthetic Rubber) (Example 2);

a butadiene-styrene copolymer prepared in solution having a 1,2 structure content equal to 56% by weight and a styrene content equal to 20% by weight, available on the market under the trade name SR946™ (Firestone) (Example 3).

The ingredients of the resulting compositions are shown in Table II.

EXAMPLE 4

(Comparison)

According to the procedure described in preceding Example 1, a rubber composition of conventional type was prepared, in which a low vinyl copolymer in the polymer base and a carbon black-based filler of a conventional type—the other ingredients being equal—were employed.

More particularly, the following ingredients were used:

a butadiene-styrene copolymer prepared in solution having a 1,2 structure content equal to 25% by weight and a styrene content equal to 25% by weight, available on the market under the trade name VSL1924S25™ (Bayer);

carbon black=ASTM N234 type, in particular Vulcan 7H (Cabot Corporation), having the following structure and surface area characteristics:

DBP (ISO 4656-1): 125 ml/100 g;

compressed DBP (ISO 6894): 100 ml/100 g;

CTAB (ISO 6810): 119 $m^2/g$.

The ingredients of the resulting composition are shown in Table II.

EXAMPLE 5

(Comparison)

In accordance with the procedure described in preceding Example 1, a rubber composition was prepared, in which a low vinyl copolymer in the polymer base and a carbon black-based reinforcing filler of the present invention—the other ingredients being equal—were employed.

More particularly, the following ingredients were used:

a butadiene-styrene copolymer prepared in solution having a 1,2 structure content equal to 25% by weight and a styrene content equal to 25% by weight, available on the market under the trade name VSL1924S25™ (Bayer);

carbon black=Vulcan 1380 (Cabot Corporation), as per preceding Example 1.

The ingredients of the resulting composition are shown in Table II.

EXAMPLE 6

(Comparison)

In accordance with the procedure described in preceding Example 1, a rubber composition was prepared, in which a high vinyl copolymer in the polymer base and a carbon black-based reinforcing filler of a conventional type—the other ingredients being equal—were employed.

More particularly, the following ingredients were used:

a butadiene-styrene copolymer prepared in solution having a 1,2 structure content equal to 56% by weight and a styrene content equal to 20% by weight, available on the market under the trade name SL563™ (Bayer);

carbon black=ASTM N234 type, in particular Vulcan 7H (Cabot Corporation), as per preceding Example 4.

The ingredients of the resulting composition are shown in Table II.

EXAMPLE 7

(Determination of the dynamic properties of the composition)

A sample of each of the compositions according to preceding Examples 1–6 was submitted to vulcanization for 10' at 170° C., with methods and apparatuses known in the art, and then to several tests in order to evaluate the dynamic properties thereof.

More particularly, the values of tangσ were determined, tang δ being defined as:

$$tang\delta = E''/E'$$

wherein:

E''=loss modulus [MPa];

E'=elasticity modulus [MPa];

with the experimental methods described hereafter and using apparatuses of the company INSTRON, available on the market.

The values of the above parameters were determined by submitting a cylindrical test piece of the vulcanized composition, having a length of 25 mm, a diameter of 14 mm and subjected to compression preloading up to a longitudinal deformation of 25% of its original height and kept at the prefixed temperature (0° or 70° C.), to a dynamic sinusoidal deformation of a maximum width of ±3.50% of the height under preloading, with a frequency of 100 cycles per second (100 Hz).

For the purposes of the present invention, it is intended that all the mentioned values of E', E'' and tangδ have been and should be measured according to the above described method.

The results of the tests carried out are reported in Table III, which shows the mean values measured on 4 tests of the loss modulus E'' (MPa), of the elasticity modulus E' (MPa) and, respectively, of tangδ (dimensionless) at the temperatures of 0° and 70° C.

Taken into account that—based on the tests carried out—the wet skid resistance of the tire results to be the better the higher is the value of tangδ measured at 0° C., and that the rolling resistance results to be the lower, the lower is the value of tangδ measured at 70° C., it is easy to infer from the data reported in Table III that the compositions of the invention (Examples 1–3) achieve a marked improvement of both characteristics with respect to the comparative compositions (Examples 4–6).

EXAMPLE 8

(Determination of the abrasion characteristics of the composition)

A sample of each of the compositions according to preceding Examples 1–6 was submitted to vulcanization with methods and apparatuses known in the art, and then to several tests in order to evaluate the abrasion characteristics thereof.

The tests were carried out according to the standards DIN 53516.

Following the abrasion test, 110 mm³ of material of the vulcanized composition of Example 1, used as comparative composition, were abraded: an abrasion index of 100 was then attributed to the same.

Afterwards, the volumes of material abraded from vulcanized samples of the compositions of Examples 2–6 were measured, attributing a % increase of the index parallel to the decrease of the volume abraded during the test.

In other words, the better the abrasion index of the test, the better the abrasion resistance of the composition sample examined.

The results of the tests carried out are shown in Table IV hereunder.

The examination of the data of said Table shows that the compositions of the invention (Examples 1–3) have abrasion characteristics fully comparable with those of a conventional composition (Example 4) and, as such, are suitable to satisfy the abrasion characteristics required to a vehicle tire tread.

EXAMPLE 9

(Road behavior)

With the rubber compositions obtained according to the preceding examples 1–6, several treads were produced by drawing in conventional apparatuses, which treads were then assembled onto 155/70-13 size tyres.

The tires so obtained were then submitted to standard tests, in order to evaluate their rolling resistance, wet skid resistance and abrasion resistance.

A. Evaluation of rolling resistance

This evaluation was made on each tire according to the standards ISO 8767, and in particular to the so-called "Torque Method" described in point 7.2.2 of the same, using conventional laboratory apparatuses.

The measurements were made at a constant speed of 80 km/h, while parasitic losses were measured according to the "Skim Reading" method described in point 6.6.1 of said standards ISO 8767.

In order to compare the compositions of the invention with those of the prior art, the power loss in kg/t measured in the tires obtained from the composition of Example 1, was attributed a rolling resistance index of 100.

Afterwards, the power losses of the tires obtained from the compositions of Examples 2–6 were measured, attributing a % increase of the index parallel to the decrease of the power loss ascertained during the test.

In other words, the higher the index value, the lower the rolling resistance of the tire examined.

The results of the tests are shown in Table V hereunder.

An examination of the data shown in said Table shows that the tires of the invention (Examples 1–3) have a rolling resistance clearly better (i.e. lower) than the resistance measured on the comparative tires (Examples 4–6).

B. Evaluation of wet skid resistance

This evaluation was carried out on the test track of Vizzola, mounting the tires onto cars FIAT Punto 60.

During the tests carried out, the performances of the tires obtained from the compositions of preceding Examples 1–6 were compared with those observed on conventional comparative tires, including treads obtained from compositions based on E-SBR (styrene-butadiene copolymers obtained in emulsion), natural rubber and polybutadiene (PIRELLI P2000).

All the tires were tested by independent test drivers who afterward assigned to the tires a rate from 0 to 10 for each of the following judgement parameters: effort at steering wheel, gearing promptness, curve stability (both oversteering and understeering), compliance, curve release and controllability.

In order to compare the tires obtained from the compositions of preceding Examples 1–6 with the comparative tires (PIRELLI P2000), the total rate achieved by the latter was attributed an index of wet skid resistance equal to 100.

The evaluation of the tires obtained from the compositions of Examples 1–6 involved a % variation of said index depending on the overall wet skid resistance of the tires examined.

The results of the tests carried out, expressed as mean of the evaluation expressed by the two test drivers, are shown in Table V hereunder.

As may be noticed from said Table, the tires of the invention have shown performances better than or fully comparable with those of the comparative tires (PIRELLI P2000).

To the contrary, the tires obtained from the compositions of Examples 4–6 offered a clearly worse performance.

C. Evaluation of wear resistance

This evaluation was carried out mounting the tires on cars FIAT Punto 60 and driving through 20,000 km of a mixed course with a fully loaded car.

During the tests carried out, the performances of the tires obtained from the compositions of preceding Examples 1–6 were compared with those observed on conventional comparative tires (PIRELLI P2000).

At the end of the 20,000 km course, the reduction in height of the tread blocks, proportional to the quantity worn off, was measured, attributing a wear resistance index of 100 for the tires PIRELLI P2000.

The evaluation of the tires obtained from the compositions of Examples 1–6 involved a % variation of said index depending on the wear observed on the tires examined.

The results of the tests carried out are shown in Table V hereunder.

As may be notice from said Table, the performances of the tires of the invention were fully comparable either with those of the comparative tires (PIRELLI P2000) or with those obtained by the compositions of Examples 4–6.

TABLE II

| Ingredients | Ex. 1 | Ex. 2 | Ex. 3 | Ex. 4 | Ex. 5 | Ex. 6 |
|---|---|---|---|---|---|---|
| S-SBR | 50 | 50 | 50 | 50 | 50 | 50 |
| NR | 50 | 50 | 50 | 50 | 50 | 50 |
| carbon black | 50 | 50 | 50 | 50 | 50 | 50 |
| ZnO | 2 | 2 | 2 | 2 | 2 | 2 |
| stearic acid | 1 | 1 | 1 | 1 | 1 | 1 |
| antioxidants | 2 | 2 | 2 | 2 | 2 | 2 |
| antifatigue agents | 1 | 1 | 1 | 1 | 1 | 1 |
| plasticizers | 5 | 5 | 5 | 5 | 5 | 5 |
| sulphur | 2 | 2 | 2 | 2 | 2 | 2 |
| accelerators | 1.4 | 1.4 | 1.4 | 1.4 | 1.4 | 1.4 |

TABLE III

| Properties | Ex. 1 | Ex. 2 | Ex. 3 | Ex. 4 | Ex. 5 | Ex. 6 |
|---|---|---|---|---|---|---|
| E' 0° C. | 17.5 | 13 | 13.8 | 14.2 | 12 | 14 |
| E' 70° C. | 5.4 | 5.5 | 5.45 | 6.6 | 5.9 | 5.6 |
| E" 0° C. | 11.3 | 7.43 | 8.33 | 5.8 | 5 | 7.8 |
| E" 70° C. | 0.71 | 0.8 | 0.82 | 1.2 | 0.94 | 0.91 |
| tangδ 0° C. | 0.773 | 0.569 | 0.604 | 0.444 | 0.421 | 0.56 |
| tangδ 70° C. | 0.132 | 0.146 | 0.151 | 0.18 | 0.16 | 0.162 |

TABLE IV

| Property | Ex. 1 | Ex. 2 | Ex. 3 | Ex. 4 | Ex. 5 | Ex. 6 |
|---|---|---|---|---|---|---|
| AB index | 100 | 104 | 104 | 103 | 110 | 98 |

AB index=DIN abrasion index

TABLE V

| Property | Ex. 1 | Ex. 2 | Ex. 3 | Ex. 4 | Ex. 5 | Ex. 6 |
|---|---|---|---|---|---|---|
| RR index | 100 | 98 | 97 | 82 | 90 | 90 |
| TSB index | 100 | 95 | 95 | 85 | 82 | 98 |
| RU index | 200 | 100 | 100 | 98 | 105 | 95 |

RR index=rolling resistance index

TSB index=wet skid resistance index

RU index=wear resistance index

We claim:

1. A process for manufacturing a tire for vehicle wheels comprising the steps of preparing around the circumference of a carcass a tread externally provided with a rolling surface and linking by vulcanization said carcass to said tread, wherein said tread is obtained by forming and vulcanizing a rubber composition comprising:

a) a cross-linkable unsaturated chain polymer base including from 30 to 70 phr of natural rubber and from 30 to 70 phr of a copolymer obtained by polymerizing a conjugated diolefin with a vinyl aromatic hydrocarbon, wherein at least 50% by weight of the conjugated diolefin polymerizes in 1,2 form with the vinyl aromatic hydrocarbon to obtain in the copolymer a quantity of from 30% to 70% by weight to the total weight thereof of an olefin fraction having a 1,2 structure, and b) from 35 to 65 phr of at least a carbon black-based reinforcing filler having a DBP absorption value measured according to ISO 4656-1 equal to at least 110 ml/100 g, a reduction in the DBP absorption value as measured after compression according to ISO 6894 equal to at least 25 ml/100 g and a surface area as measured by means of CTAB absorption according to ISO 6810 not greater than 120 m$^2$/g, and optionally c) from 0 to 25 phr of at least a secondary silica-based reinforcing filler.

2. A tire for vehicles, comprising:

at least a carcass ply anchored at respective opposite edges to a couple of bead wires, incorporated each in corresponding beads defined along internal circumferential edges of said tire;

at least a belt strip extending circumferentially around said carcass ply;

a tread comprising at least a reinforcing filler dispersed throughout a polymer base, circumferentially placed around said belt strip and having externally a rolling surface suitable for touching the ground;

wherein the tread is obtained by forming and vulcanizing a rubber composition comprising:

a) a cross-linkable unsaturated chain polymer base including from 30 to 70 phr of natural rubber and from 30 to 70 phr of a copolymer obtained by polymerizing a conjugated diolefin with a vinyl aromatic hydrocarbon, wherein at least 50% by weight of the conjugated diolefin polymerizes in 1,2 form with the vinyl aromatic hydrocarbon to obtain in the copolymer a quantity of from 30% to 70% by weight to the total weight thereof of an olefin fraction having a 1,2 structure, and b) from 35 to 65 phr of at least a carbon black-based reinforcing filler having a DBP absorption value measured according to ISO 4656-1 equal to at least 110 ml/100 g, a reduction in the DBP absorption value as measured after compression according to ISO 6894 equal to at least 25 ml/100 g and a surface area as measured by means of CTAB absorption according to ISO 6810 not greater than 120 m$^2$/g, and optionally c) from 0 to 25 phr of at least a secondary silica-based reinforcing filler.

3. A tire for vehicles according to claim 2, wherein the tread has a tanδ value at 0° C. higher than 0.45.

4. A tire for vehicles according to claim 2, wherein the tread has a tanσ value at 70° lower than 0.16.

5. A process for reducing the rolling resistance of tires, said tires being provided with at least a carcass ply anchored at respective opposite edges to a couple of bead wires, incorporated each in corresponding beads defined along internal circumferential edges of said tire, at least a belt strip extending circumferentially around said carcass ply and a tread circumferentially placed around said belt strip and having externally a rolling surface suitable for touching the ground, wherein the tread is obtained by forming and vulcanizing a rubber composition comprising:

a) a cross-linkable unsaturated chain polymer base including from 30 to 70 phr of natural rubber and from 30 to 70 phr of a copolymer obtained by polymerizing a conjugated diolefin with a vinyl aromatic hydrocarbon, wherein at least 50% by weight of the conjugated diolefin polymerizes in 1,2 form with the vinyl aromatic hydrocarbon to obtain in the copolymer a quantity of from 30% to 70% by weight to the total weight thereof of an olefin fraction having a 1,2 structure, and b) from 35 to 65 phr of at least a carbon black-based reinforcing filler having a DBP absorption value measured according to ISO 4656-1 equal to at least 110 ml/100 g, a reduction in the DBP absorption value as measured after compression according to ISO 6894 equal to at least 25 ml/100 g and a surface area as measured by means of CTAB absorption according to ISO 6810 not greater than 120 m$^2$/g, and optionally c) from 0 to 25 phr of at least a secondary silica-based reinforcing filler.

* * * * *